March 10, 1970 M. E. FRERKING 3,500,250

CARRIER SUPPRESSION SYSTEM FOR SPECTRUM ANALYSIS

Filed March 6, 1967

INVENTOR.
MARVIN E. FRERKING

BY Moody & Anderson

AGENTS

United States Patent Office 3,500,250
Patented Mar. 10, 1970

3,500,250

CARRIER SUPPRESSION SYSTEM FOR SPECTRUM ANALYSIS

Marvin E. Frerking, Cedar Rapids, Iowa, assignor to Collins Radio Company, Cedar Rapids, Iowa, a corporation of Iowa Filed Mar. 6, 1967, Ser. No. 620,867
Int. Cl. H03c *1/52*
U.S. Cl. 332—44 6 Claims

ABSTRACT OF THE DISCLOSURE

A system for enhancing spectral analysis of a composite signal of carrier and sideband energies. A regenerated equal amplitude and phase-locked carrier signal is combined with the composite input to effect cancellation of carrier signal components without affecting sideband levels. The signal resulting from the combination may be employed advantageously as feedback in a phase-locked loop controlling the frequency of the regenerated carrier signal to effect amplitude nulling of the input and the regenerated carrier frequency components.

This invention relates generally to a signal suppression system and more particularly to a system by means of which the carrier of a composite signal may be reduced in amplitude without materially affecting the level of the sideband energy contained in the signal.

The present invention may advantageously be employed to permit spectrum analysis of sidebands which normally may be considerably below the maximum resolution of a spectrum analyzer. The system of the present invention also provides a means for modifying the signal as it may be applied to a spectrum analyzer such that sideband energy in comparison to the carrier is raised to a level, or alternatively, the carrier level is reduced, such that the sideband energy may be readily detected and measured.

The present invention is featured in the provision of means for regenerating a reference oscillator frequency having an amplitude and phase like that of an input carrier signal, such as a test signal, together with means for subtracting these signals to effect cancellation of carrier energy without affecting sidebands. A subsequent amplification results in a sideband level higher than that originally present in the test signal by the amount the carrier was suppressed.

A further feature of the present invention is the provision of a system of carrier suppression wherein precise manual phase adjustment between the test and regenerated signals is not necessary to affect and hold phase lock.

These and other features and objects of the present invention will become apparent upon reading the following description in accordance with the drawings in which.

A need ofttimes arises for analysis of sideband energy contained in a signal under test where sidebands are at a level substantially down from the carrier level such that the resolution of a spectrum analyzer does not permit detection and measurement.

Generally speaking, the present invention provides selective amplification of the sideband energy levels to the exclusion of the carrier level such that the original signal is modified to where the level of the sideband energy is considerably increased with respect to that of the carrier. A more exacting analysis of the sideband energy levels which originally fall a considerable number of decibels below that of the carrier is thus permitted.

Although the present invention will be described particularly with reference to treatment of signals for application to spectrum analyzers, the invention, in a more general sense, applies to carrier suppression per se.

The present invention makes possible the reduction of the carrier amplitude of a composite signal without materially affecting the sideband level, by means of regenerating a signal in or out of phase and of equal amplitude as compared with the carrier of the signal under test. Means are provided to combine (subtract or add as appropriate) the test signal from the regenerated signal to effect a cancellation of carrier energy while allowing sideband energy to be translated through the system virtually unaffected.

Figures 1, 6:
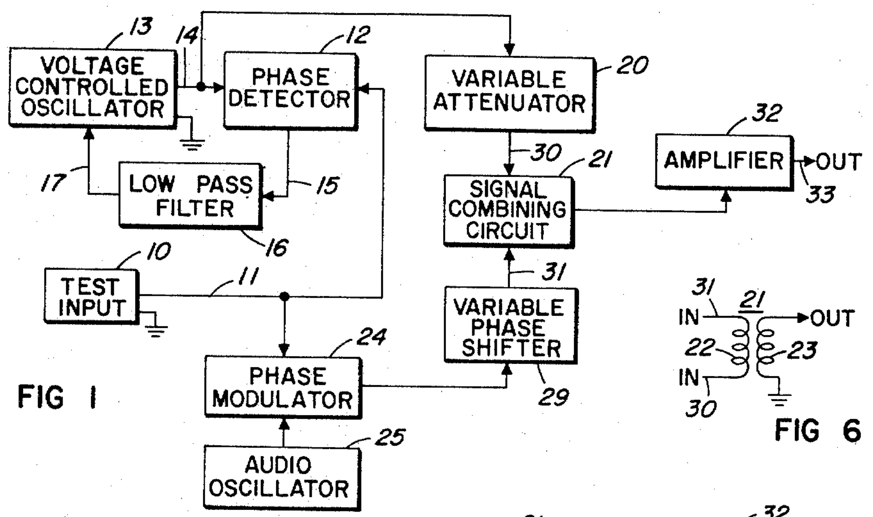
FIGURE 1 is a functional block diagram of a first embodiment of the invention.
FIGURES 6 and 7 represent alternate signal combining circuitries for each of the embodiments.

With reference to FIGURE 1, a first embodiment of the invention is functionally depicted wherein a test input source 10, such as an oscillator, develops an output signal (carrier plus sideband energy) depicted by reference numeral 11. A voltage controlled oscillator 13 is phase locked to the test input signal 11 by means of a phase detector 12 and low pass filter 16. The output from the voltage controlled oscillator and the test input signal 11 are applied as respective inputs to the phase detector 12. The phase detector develops an output 15 proportional to the phase discrepancy between the inputs to the detector, which is subsequently filtered in low pass filter 16, to develop a DC control output 17 for application to the voltage controlled oscillator. The voltage controlled oscillator output 14 is applied through a variable attenuator 20 to develop a first signal 30. The test input signal 11 is applied through a phase modulator 24 (the function of which will be further described), and a variable phase shifter 29 to develop a second signal 31.

Since the output of the voltage controlled oscillator 13, as controlled by the aforementioned phase locked loop, will be approximately 90° out of phase with the test input signal, the variable phase shifter 29 is adjusted to insert approximately 90° phase shift such that the outputs 30 and 31 may be adjusted to an in-phase or 180° out of phase relationship. The variable attenuator 20, placed in series with signal 30, is adjusted such that the outputs are of equal amplitude. Outputs 30 and 31 are applied to a signal combining circuitry 21 to effect a cancellation by addition of out of phase inputs, or subtraction of in-phase inputs. As shown in FIGURE 6, combining circuitry 21 might be embodied as a transformer to subtract in-phase inputs. The respective ends of the primary winding 22 of the transformer receive the reference VCO signal and the test input signal respectively with phase shifter 29 being adjusted to effect an in-phase relationship, whereby the signals 30 and 31 are subtracted by the transformer circuitry. Thus, when the phase shifter 29 and the attenuator 20 are properly adjusted so that the test input signal 11 and the regenerated reference signal 14 from the VCO, as applied to the primary windings of the transformer, are exactly in phase and of the same amplitude, the output on the secondary winding of the transformer 21 consists of the test input signal 11 including sideband energy with a reduction of the carrier amplitude by as much as 60 db. The sideband energy applied to the secondary of the transformer 21 is virtually unaffected. The signal developed on the secondary winding 23 of the transformer 21 may then be reamplified in an amplifier 32 so as, for example, to restore the carrier level to the initial level existing at the input. The resulting output signal 33 then corresponds to the test input signal 11 with the energy defining the sideband spectrum considerably increased from the original level as compared to the carrier level. Should the output signal 33 then be applied to a spectrum analyzer, it is possible to detect and measure sideband energy which normally would fall beneath the maximum resolution of the analyzer.

Figure 7:
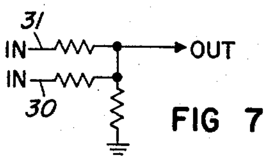

Signal combining means 21 may alternatively be embodied as an adding function in which case the phase shifter 29 would be adjusted for an out-of-phase relationship between the applied signals. The adding function may be implemented as a simple resistor adder as shown in FIGURE 7.

The embodiment of FIGURE 1 is inherently phase-sensitive and the system depends upon repetitive nulling adjustments of the variable attenuator 20 and phase shifter 29 to hold the desired suppression. An improved embodiment of the present invention is illustrated functionally in FIGURE 2.

Figures 2, 3, 4:
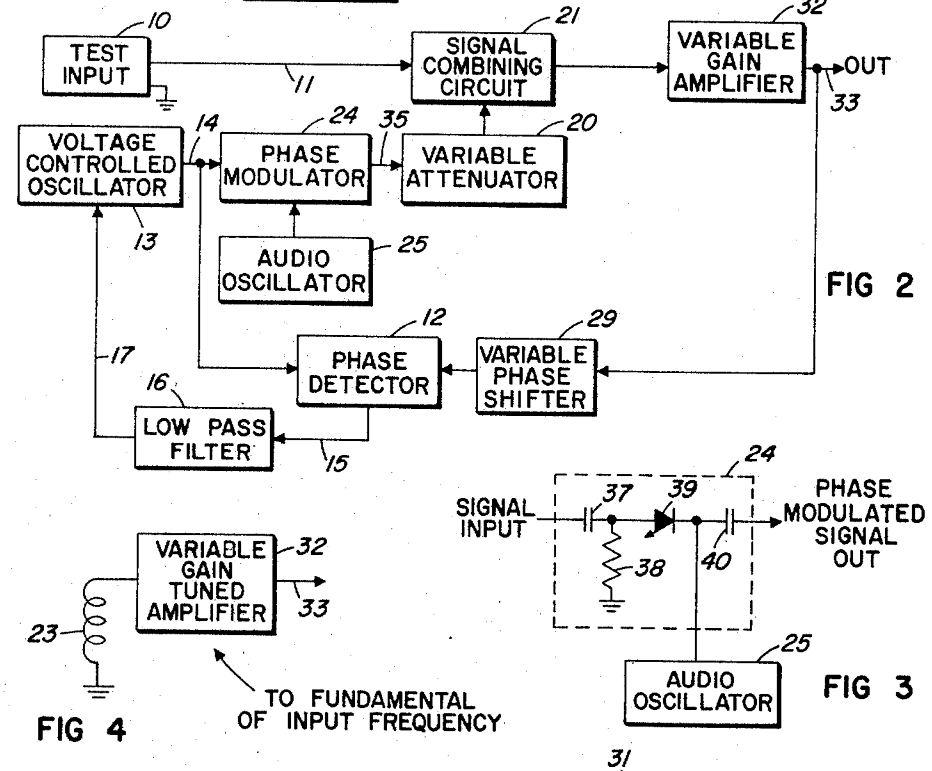
FIGURE 2 is a functional block diagram of an improved embodiment of the invention.
FIGURE 3 is a partial schematic diagram of a portion of the circuitry of the embodiment of FIGURES 1 and 2.
FIGURES 4 and 5 represent alternate output circuitries for each of the embodiments.

The system of FIGURE 2 has a decided advantage over that of FIGURE 1, in that the phase need not be nulled with precise manual adjustment of the phase shifter 29. All that is required in the embodiment of FIGURE 2 is to adjust the phase approximately (within about 30°) and the phase detector 12 will take over the control, increasing in sensitivity as the variable attenuator 20 is adjusted for a null. The improved operation of the embodiment of FIGURE 2 is realized by utilizing the composite output signal 33 as the input to the phase detector in the VCO loop rather than the test input signal 11, per se.

The system of FIGURE 2, as in the previous embodiment, regenerates a reference signal with phase and amplitude appropriately related to that of the test input signal 11. The regenerated and test signals are again applied as respective inputs to the signal combining circuit 21. A phase modulation of one of the signals supplied to the combining circuitry may again be effected by means of a phase modulator 24. An appropriate 90° phase shift is introduced once again due to the inherent 90° phase displacement between the signal regenerated by VCO 13, and the input test signal 11.

The system of FIGURE 2 requires only that the phase shifter 29 be adjusted for an approximately in-phase or out-of-phase relationship between the two signals 30 and 31 applied to the combining circuitry 21. Since the composite output signal 33 is in this case applied to the VCO loop, the phase detector 12 then takes over control and increases in sensitivity as the variable attenuator 20 is adjusted for a null. This action occurs because, as the two signals 30 and 31 which are combined, approach zero or 180° of phase error and are adjusted to be of equal amplitude, the resultant signal, the output 33, shifts greatly in phase for very small changes in the phase of either of the two combined signals 30 and 31.

In practice, stray coupling, etc., prevents the carrier from dropping out completely and the phase detector sensitivity decreases, preventing the suppression ratio from approaching infinity. However, with an embodiment in accordance with FIGURE 2 which was caused to be constructed, a test at 3 megacycles maintained values of suppression ratio equal to one thousand for several hours without readjustment.

Each of the embodiments of FIGURES 1 and 2 were described as including means for phase modulating one or the other of the regenerated (VCO) signal or the test input signal. The phase modulation was described as being introduced by a phase modulator 24. For purpose of spectrum analysis, it might be expedient to introduce into the spectrum reference frequencies for measurement purposes. For example, in either of the embodiments, the phase modulator 24 might be controlled by an audio oscillator 25 operating at 1-kc. such that the output 33 would contain the normal spectrum with the addition of the 1-kc. signal and harmonics thereof which could be used for calibration of the system. The system may also be calibrated by observing how much adjustment is made to the variable gain amplifier.

FIGURE 3 illustrates a type of phase modulator which may be employed comprising an RC network 37–38 to which the input signal to be phase-modulated is applied. A voltage variable capacitor 39 is serially connected with the first capacitor 37 and a second capacitor 40. The output from the audio oscillator 25 is applied to the junction of the variable capacitor 39 and capacitor 40 so as to phase modulate the input signal at a rate defined by the output of the audio oscillator 29.

Figure 5:
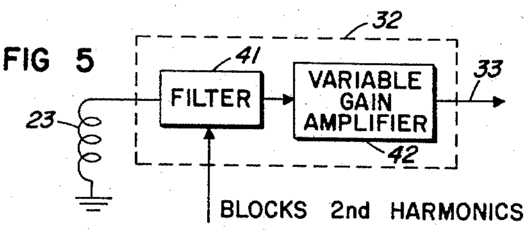

In preferred embodiments of the systems of either FIGURE 1 or FIGURE 2, the output amplifier 32 might preferably be one of the arrangements depicted in FIGURES 4 and 5. In order to eliminate carrier harmonics in the output, the amplifier 32 may be tuned to the fundamental of the signal under test, Alternatively, the amplifier 32 might be comprised of a filter 41 and untuned amplifier 42 as depicted in FIGURE 5 where the filter would be selected to block harmonics.

The present invention is thus seen to provide a means for suppressing the carrier of a composite input signal without effectively changing the sideband energy level. Reamplification of the composite output signal developed from subtraction of the regenerated reference from the input under test is seen to result in an improved signal for spectrum analysis, permitting detection and measurement of sideband energy levels which might normally be far beneath the maximum resolution of a spectrum analyzer.

Although the present invention has been described with respect to particular embodiments thereof, it is not to be so limited as changes might be made therein which fall within the scope of the invention as defined by the appended claims.

I claim:

1. A carrier suppression system for a composite input signal comprised of carrier and sideband frequency components comprising a signal combining means, said composite input signal being applied as a first input to said signal combining means, means for regenerating a reference signal equal in frequency to the carrier component of said composite input signal comprising a phase shifting means receiving the output from said combining means, said phase shifting means including means to adjust the relative phase between said composite input signal carrier and said regenerated signal for a phase relationship defined as $n(180°)$ where $n$ is an integer including zero, phase detecting means, the output from said phase shifting means being applied by the first input to phase detecting means, a voltage controlled oscillator, the output from said voltage controlled oscillator applied as a second input to said phase detecting means, the output from said phase detecting means being applied to a low pass filter means, the output from said low pass filter means being connected to and controlling the frequency of said voltage control oscillator, the output from said voltage control oscillator being applied to an amplitude adjustment means, and the output from said amplitude adjustment means being applied as a second input to said signal combining means, said signal combining means effecting cancellation of input signals thereto having like amplitudes and said above-defined phase relationship, said signal combining means developing an output with said carrier frequency component attenuated and said sideband frequency components essentially unaffected.

2. The system as defined in claim 1 further comprising means to phase modulate at a selected audio rate one of said first and second input signals applied to said signal combining means.

3. A system as defined in claim 1 wherein a signal amplifying means comprising a variable gain amplifier including means to block harmonics of said carrier frequency component is included to receive the output from said signal combining means and provide an output to said phase shifting means.

4. The system as defined in claim 1 wherein said amplifying means is adapted to amplify the input signal thereto by an amount sufficient to restore the carrier frequency component of the input signal as applied thereto to that level existing in said composite input signal.

5. A system as defined in claim 1 wherein said signal combining means comprises a signal subtracting means, said phase shifting means being adjusted to effect an in-phase relationship between the inputs to said subtracting means.

6. A system as defined in claim 1 wherein said signal combining means comprises a signal adding means, said phase shifting means being adjusted to effect an out-of-phase relationship between the inputs to said adding means.

References Cited

UNITED STATES PATENTS

| | | | |
|---|---|---|---|
| 3,201,692 | 8/1965 | Sichak et al. | 325—50 X |
| 3,229,230 | 1/1966 | Feldman | 332—44 |

ROY LAKE, Primary Examiner

L. J. DAHL, Assistant Examiner

U.S. Cl. X.R.

325—49